United States Patent [19]

James et al.

[11] 4,283,310

[45] Aug. 11, 1981

[54] P.V.C. COMPOSITIONS FOR EXTRUSION MOULDING

[75] Inventors: Kenneth James, Reading; Frederick J. Smith, Prescot, both of England

[73] Assignee: Talres Development (N.A.) N.V., Netherlands Antilles

[21] Appl. No.: 91,396

[22] Filed: Nov. 6, 1979

[30] Foreign Application Priority Data

Nov. 9, 1978 [GB] United Kingdom ............... 43935/78

[51] Int. Cl.$^3$ .......................... C08K 5/09; C08K 5/10; C08L 27/06
[52] U.S. Cl. ............................. 260/23 XA; 252/182; 252/381; 252/383; 252/384; 252/385; 260/45.75 W; 260/45.85 E; 260/998.16; 260/DIG. 15
[58] Field of Search .................. 260/23 XA, 45.75 W, 260/45.85 E; 252/381, 383, 384, 385, 182

[56] References Cited

U.S. PATENT DOCUMENTS

| | | | |
|---|---|---|---|
| 2,514,424 | 7/1950 | Smith | 260/23 XA |
| 3,004,000 | 10/1961 | Kauder et al. | 260/45.75 W |
| 3,351,577 | 11/1967 | Krumm | 260/45.75 W |
| 3,362,923 | 1/1968 | Knuth | 260/45.75 W |
| 3,960,790 | 6/1976 | Khanna | 260/23 XA |
| 3,975,321 | 8/1976 | Heiberger | 260/23 XA |
| 4,032,702 | 6/1977 | James | 536/119 |
| 4,055,518 | 10/1977 | Kakitani et al. | 260/23 XA |
| 4,072,790 | 2/1978 | Creekmore et al. | 260/23 XA |

*Primary Examiner*—Ronald W. Griffin
*Attorney, Agent, or Firm*—Ostrolenk, Faber, Gerb & Soffen

[57] ABSTRACT

A polyvinyl chloride composition for use in extrusion moulding contains an alkaline earth metal or zinc soap of one or more fatty acids having an iodine value of from 20-60 as the only stabilizer, a lubricant and is lead-free.

12 Claims, No Drawings

P.V.C. COMPOSITIONS FOR EXTRUSION MOULDING

This invention relates to polyvinyl chloride compositions for extrusion moulding, for example in the production of drain pipes and domestic water pipes.

Polyvinyl chloride compositions for extrusion moulding must contain a stabiliser to prevent break-down during heating and extrusion. Conventionally, they also include lubricants to aid extrusion and other conventional additives such as pigments and fillers to render the composition opaque.

The stabiliser is conventionally a heavy metal salt, particularly a salt of such toxic elements as lead and cadmium. Fatty acid salts of alkaline earth metals such as calcium can be used, but in conventional formulations they are generally used in combination with toxic materials such as lead salts. It has previously been found possible to stabilise the resin formulation in the absence of the toxic compounds only in the case of calcium/zinc-based stabilisers used in relatively high proportions, typically 3-4 parts by weight per hundred of resin.

It appears that alkaline earth metal or other non-toxic metal compounds which might be of use as stabilisers generally do not have sufficient affinity for the polyvinyl chloride resin and so the physical properties of the formulation are unsuitable. For food packaging applications, organo-tin based stabilisers have been developed, but they are costly and this limits their use.

Naturally, the use of toxic materials such as lead salts is undesirable commercially, both for safety in industrial practice and for safety of the eventual user. The latter consideration is particularly important with regard to domestic water piping, which is of considerable commercial interest as a replacement for the normally used copper piping. In order to limit the amount of lead present in the plastic formulation, there are various safety standards limiting the average density of the composition. For example, DIN 8061 in West Germany requires an average density of 0.8 to 1.4 $gcm^{-3}$. An equivalent French provisional standard P16-342:1973 requires a density of 1.37-1.42 $gcm^{-3}$. These values can be difficult to achieve using sufficient lead for good stabilisation and consequently it is sometimes necessary to tolerate borderline stability in order to fulfil legal requirements.

In the PVC compositions previously used, the only alkaline earth metal salt which has been adopted, in combination with one or more lead salts, is calcium stearate. This is a fully saturated compound.

We have now found that if the calcium or other alkaline earth metal or zinc salt is of a fatty acid, preferably partially unsaturated, it is possible to dispense with the toxic lead compounds and still obtain an adequately stabilised composition which, provided it contains a lubricant, can be heated and extrusion moulded in the usual way.

By the term "partially unsaturated" we mean that least some of the fatty acid radicals should contain one or more olefinic bonds. It is particularly desirable to use the salt of a mixture of fatty acids, for example the mixture of fatty acids obtained from a naturally occurring triglyceride such as beef tallow or a vegetable oil. In such a mixture of fatty acids, there will be a proportion of saturated and a proportion of unsaturated acids. The degree of unsaturation is conveniently measured by the well-known iodine value, based on the reactivity of the parent fat with iodine monochloride. A fully saturated fat will, of course, have an iodine value of substantially zero, while a highly unsaturated fat will have an iodine value of 100 or more. We have found that particularly advantageous results can be obtained using an alkaline earth metal or zinc salt of a mixture of fatty acids derived from a fat having an iodine value of from 20 to 60, particularly from 40 to 50. For example, the mixture of fatty acids derived from a fractionated tallow source of i.v. 45 contains about 40% of oleic acid and only 23% of stearic acid. In contrast, the fatty acids derived from fully hydrogenated tallow comprise about 60% stearic acid, 25% palmitic acid and no oleic acid.

We have found that the salt of partially unsaturated fatty acids can be incorporated into the polyvinyl chloride resin composition at a level which is conveniently at about 1 to 3 parts per hundred parts by weight of resin, preferably about 1.5 to 2.5 parts per hundred parts of resin.

The composition must also contain a lubricant, for example a commercially available montan wax such as Hoechst Wax E at a level of about 0.72 parts per hundred of resin. One particularly advantageous composition is 2.5 parts per hundred of resin of the calcium salt of a fatty acid mixture derived from tallow of i.v. 45, together with 1.5 parts per hundred resin of Hoechst Wax E.

Instead of the commercially available lubricant, it is possible to use mixed glycerides of fatty acids, i.e. a mixture of mono-, di- and tri-glycerides, either alone, or in combination with sucrose esters of fatty acids.

A mixture of soaps, and glycerides, optionally with sucrose esters of use according to the present invention, may be obtained from any convenient process and the different components may be added together from diffrent sources. However, it is particularly convenient to obtain the mixture from the transesterification of sucrose with triglycerides, particularly in a solvent-free process such as that of our British Patent No. 1,399,053 or U.S. Pat. No. 4,032,702. The crude material obtained from this process can be treated with an aqueous salt of the alkaline earth metal or zinc to obtain a solid cake generally comprising by weight from 30 to 50% of soaps, 20 to 35% sucrose esters and 15 to 25% mixed glycerides, together with a minor amount of free sugar and inorganic matter. This material can be used directly in the polyvinyl chloride composition, for example at a level of four parts per hundred resin.

The crude mixture can however be further purified by solvent extraction to remove glycerides and sucrose esters in order to give a mixture of calcium soaps of fatty acids, and this can be incorporated in the polyvinyl chloride composition with a montan wax or with a proportion of mixed glycerides. A typical example would be the use of about 2.5 parts per hundred resin of calcium soaps together with about 1 to 1.5 parts per hundred resin of mixed glycerides.

It is preferable that the calcium soap is formed in situ in the lubricant mixture, as we have found the product obtained in this way to have particularly good properties. Thus, a soluble calcium (or other alkaline earth metal or zinc) salt may be added to a solution of a fatty acid alkali metal salt, e.g. a potassium salt, and the lubricant in a suitable solvent, e.g. isopropanol. Dilution with water then gives an intimate mixture of the soap and the lubricant which can be washed, dried and used in the PVC composition. This operation is equally applicable to glycerides and other lubricants.

We have found, according to the invention, that the use of alkaline earth metal or zinc salts as defined above, particularly calcium salts, together with an appropriate lubricant can render totally lead-free polyvinyl chloride compositions possible which can be melt extruded successfully to provide moulded products of good strength and durability. The products obtained are non-toxic in that they do not contain heavy metals such as lead or cadmium. It is also believed that the presence of sucrose esters may reduce the amount of free vinyl chloride monomer present in the composition and thus also reduce the toxicity in this way.

The alkaline earth metal or zinc salt can be incorporated into the polyvinyl chloride composition as a dry additive at the same time that other ingredients such as pigments and lubricants are being added. Thus, for example, the PVC polymer composition, pigments such as titanium dioxide and carbon black, the alkaline earth metal or zinc salt and the lubricant can all be charged into a high speed mixer such as a Baker Perkins 24/48 liter high speed/cooler combination mixture, and mixed to a discharge temperature of 120° C. The cooled material is a free flow powder blend which can be stored in polythene bags.

The following example illustrates the invention further.

EXAMPLE

Four formulations were compounded as shown in the following table, all parts being by weight. Formulation 1 is a control formulation, typical of the commercial composition used in PVC rainwater pipes.

TABLE 1

|  | Formulation | | | |
| --- | --- | --- | --- | --- |
|  | 1 | 2 | 3 | 4 |
| PVC polymer | 100 | 100 | 100 | 100 |
| Tribasic lead sulphate | 2.5 | — | — | — |
| Dibasic lead stearate | 0.5 | — | — | — |
| Calcium stearate | 0.5 | — | — | — |
| Hoechst Wax E | 0.5 | — | — | 1.5 |
| Mixture A | — | 4 | — | — |
| Mixed calcium soaps i.v. 45 | — | — | 2.5 | 2.5 |
| Mixed glycerides of mixed fatty acids i.v. 45 | — | — | 1.5 | — |
| Titanium dioxide | 0.5 | 0.5 | 0.5 | 0.5 |
| Carbon black | 0.005 | 0.005 | 0.005 | 0.005 |

Mixture A = Mixed fatty acid i.v. 45 derivatives comprising: 30–50% calcium soaps; 20–35% sucrose mono- and diesters; 15–25% mixed glycerides. The PVC polymer used was Corvic (Trade Mark) D60/11 supplied by I.C.I. Limited. The lead salts were supplied by Associated Lead Manufacturers Limited who also supplied the calcium stearate. Hoechst Wax E is montan wax supplied by Hoechst (U.K.) Limited. The titanium dioxide was supplied by Laporte Chemicals Limited and the carbon black was supplied by Sevalco Limited. The ingredients were mixed in a Baker Perkins 24/48 liter high speed/cooler combination mixer and mixed to a high mixture discharge temperature of 120° C. The mixture was discharged from the cooler at 30° C.

The formulations were extruded using a Schloemann BT50-8 twin screw extruder having screw diameters of 48 mm and a length to diameter ratio of 8:1, contrarotating, with a 63 mm diameter rainwater pipe die to produce rainwater pipe to BS 4576 (metric) dimension with 2 mm±0.1 mm wall thickness. The pipe was pressure sized with a cooling sleeve of water temperature 40° C. The screw speed was 19 rpm and the extrusion temperature was about 175° C.

The pipe samples produced were tested for tensile strength, heat reversion, Vicat softening, density and impact resistance.

The tensile strength at yield and elongation to break was tested as per BS 2782 "Methods of Testing Plastics" Part 3 Method 320A:1976. Two rates of load application were used: 20 mm/min and 500 mm/min. The test pieces were prepared by heating sections of the pipes to 120° C. and flattening them in a press. The required test pieces were then machined from these sections as per FIG. 1 of Method 320A. The tensile strength and elongation at break were autographically recoded.

The Vicat softening point was tested as per BS 2782 "Methods of Testing Plastics" Method 120B. "Determination of the Vicat Softening Temperature of Thermosplastics", 1976. A force of 49N (5 Kgf), a depth of penetration of 1 mm and a heating rate of 50° C./h was used. High temperature silicone oil was used for the heat transfer medium.

The density was determined for each pipe by a hydrostatic weight method (i.e. comparison of the weight of the test pieces in air and water).

The heat reversion test was as per BS 4576 "Unplasticised PVC Rainwater Goods", Part 1:1970. The test pieces were tested in an air circulating oven at 120° C. for 30 minutes, as per Appendix C of the said standard.

The impact test was as per BS 4576 Part 1:1970. Weights of 2 kg were dropped on to the pipes from a height of 2 meters. The details of the test are given in Appendix D of the standard.

The results are given in Table 2 below.

TABLE 2

| Formulation | Extrusion | Tensile Strength 20mm/min MPa | Tensile Strength 500mm/min MPa | Heat Reversion % Change | Vicat Softening Point °C. | Density g cm$^{-3}$ | Impact Test |
| --- | --- | --- | --- | --- | --- | --- | --- |
| 1 | good | 57.3 | 66.6 | −1.5 | 82.95 | 1.43 | Pass |
| 2 | good | 52.0 | 60.0 | −4.5 | 78.6 | 1.39 | pass |
| 3 | good but tended to break | 57.8 | 60.4 | −1.75 | 79.3 | 1.39 | pass |
| 4 | good | 58.3 | 62.9 | −4.25 | 73.95 | 1.39 | pass |

NB: 1 MPa equals 10.20 Kgf/cm$^2$ = 10$^7$ dyne/cm$^2$ = 145.0 lb in$^{-2}$. A minimum tensile strength of 45 MPa is required and this criterion is met by all the test formulations. It should be noted that the Vicat softening point for formulation 4 is on the low side, but minor modification of formulation would produce a temperature of at least 78.0° C. as required (for example reduced wax level or replacement by another wax lubricant.)

We claim:

1. A lead-free stabilized PVC composition for extrusion molding containing as the only stabilizer an alkaline earth metal or zinc soap of one or more fatty acids having an iodine value of from 20-60, and containing a lubricant.

2. A composition according to claim 1, in which the said soap is present at a level of 1 to 3 parts per hundred parts by weight of PVC resin.

3. A composition according to claim 1 or claim 2, in which the said soap is a calcium soap.

4. A composition according to claim 1, in which the said soap is a soap of a mixture of fatty acids obtained from a naturally occurring triglyceride.

5. A composition according to claim 1, in which the lubricant comprises a fatty acid mixed glyceride material.

6. A composition according to claim 5, in which the mixed glycerides are in combination with one or more sugar or polyol fatty acid esters.

7. A composition according to claim 1 or claim 5, formed by adding to the PVC resin a mixture of the soap in situ in the lubricant.

8. A composition according to claim 5, containing about 2.5 parts per hundred resin of said soap and about 1-1.5 parts per hundred resin of mixed glycerides.

9. A composition according to claim 6, containing about 4 parts per hundred resin of a material comprising by weight from 30 to 50% of said soap, 20 to 35% sucrose esters and 15 to 25% mixed glycerides.

10. A composition according to claim 5, in which the lubricant comprises montan wax.

11. A stabilising composition for PVC, comprising an intimate mixture of an alkaline earth metal or zinc soap of one or more fatty acids having an iodine value of from 20 to 60, a lubricant, and one or more pigments.

12. An extruded plastics article formed from a PVC composition containing a lead-free stabilised PVC composition containing as the only stabiliser an alkaline earth metal or zinc soap of one or more fatty acids having an iodine value of from 20-60, and containing a lubricant.

* * * * *